United States Patent
Liu et al.

(10) Patent No.: US 8,472,365 B2
(45) Date of Patent: Jun. 25, 2013

(54) METHOD AND SYSTEM FOR ACKNOWLEDGEMENT AND RETRANSMISSION OF MULTICAST DATA IN WIRELESS LOCAL AREA NETWORKS

(75) Inventors: Hang Liu, Yardley, PA (US); Ishan Mandrekar, Monmouth Junction, NJ (US); Minquan Wu, Princeton Junction, NJ (US); Ramkumar Perumanam, Edison, NJ (US); Saurabh Mathur, Monmouth Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 81 days.

(21) Appl. No.: 12/737,070

(22) PCT Filed: Jun. 26, 2008

(86) PCT No.: PCT/US2008/008032
§ 371 (c)(1),
(2), (4) Date: Jan. 18, 2011

(87) PCT Pub. No.: WO2009/157902
PCT Pub. Date: Dec. 30, 2009

(65) Prior Publication Data
US 2011/0116435 A1 May 19, 2011

(51) Int. Cl.
*H04W 72/04* (2009.01)

(52) U.S. Cl.
USPC .................. 370/312; 370/330; 370/315

(58) Field of Classification Search
USPC ............................. 370/312, 213, 390
See application file for complete search history.

(56) References Cited

U.S. PATENT DOCUMENTS

| | | | |
|---|---|---|---|
| 4,760,572 | A | 7/1988 | Tomikawa |
| 5,592,483 | A | 1/1997 | Hieda et al. |
| 5,901,362 | A | 5/1999 | Cheung et al. |
| 6,411,290 | B1 | 6/2002 | Sasaki |
| 7,349,349 | B2 | 3/2008 | Acharya et al. |
| 7,613,202 | B2 | 11/2009 | Doi et al. |
| 7,657,276 | B2 | 2/2010 | Sakoda |
| 7,907,627 | B2 | 3/2011 | Yang et al. |
| 8,009,596 | B2 | 8/2011 | Tomioka |

(Continued)

FOREIGN PATENT DOCUMENTS

| | | |
|---|---|---|
| CN | 1652522 A | 8/2008 |
| EP | 1686730 | 8/2006 |

(Continued)

OTHER PUBLICATIONS

Search Report dated Jul. 1, 2009.

(Continued)

*Primary Examiner* — Dang Ton
*Assistant Examiner* — Pamit Kaur
(74) *Attorney, Agent, or Firm* — Robert D. Shedd; Jeffrey M. Navon; Catherine A. Cooper (57) ABSTRACT

A method and apparatus are described including multicasting a plurality of data units and multicasting a request for acknowledging receipt of the plurality of data units, receiving signals responsive to the request. Also described are a method and apparatus including receiving a multicast request to acknowledge receipt of data, determining if a response to the request is required, determining status of the data, preparing the response based on the determining acts and transmitting the response.

14 Claims, 10 Drawing Sheets

U.S. PATENT DOCUMENTS

| | | | |
|---|---|---|---|
| 2002/0071448 A1 | 6/2002 | Cervello et al. | |
| 2002/0152324 A1 | 10/2002 | Sherman | |
| 2003/0153339 A1 | 8/2003 | Crockett et al. | |
| 2003/0227934 A1 | 12/2003 | White et al. | |
| 2006/0013179 A1 | 1/2006 | Yamane | |
| 2006/0109859 A1 | 5/2006 | Acharya et al. | |
| 2006/0114867 A1 | 6/2006 | Du et al. | |
| 2006/0126494 A1* | 6/2006 | Dougall et al. | 370/213 |
| 2006/0154603 A1* | 7/2006 | Sachs et al. | 455/39 |
| 2006/0165114 A1 | 7/2006 | Diepstraten et al. | |
| 2007/0002887 A1 | 1/2007 | Benveniste | |
| 2007/0016637 A1 | 1/2007 | Brawn et al. | |
| 2007/0258466 A1 | 11/2007 | Kakani | |
| 2007/0268884 A1 | 11/2007 | Kolavennu et al. | |
| 2008/0002591 A1 | 1/2008 | Ueno | |
| 2008/0004076 A1 | 1/2008 | Adachi et al. | |
| 2008/0063106 A1 | 3/2008 | Hahm et al. | |
| 2008/0267181 A1* | 10/2008 | Monga et al. | 370/390 |
| 2009/0067389 A1 | 3/2009 | Lee et al. | |
| 2011/0310871 A1 | 12/2011 | Fischer et al. | |

FOREIGN PATENT DOCUMENTS

| | | |
|---|---|---|
| JP | 11196088 | 7/1999 |
| JP | 11196088 A | 7/1999 |
| JP | 2002521864 | 7/2002 |
| JP | 2005236923 | 9/2005 |
| JP | 2005236923 A | 9/2005 |
| JP | 2006020290 | 1/2006 |
| JP | 2006060408 | 3/2006 |
| JP | 2006060408 A | 3/2006 |
| JP | 2006270914 | 10/2006 |
| JP | 2007150840 | 6/2007 |
| JP | 2007150840 A | 6/2007 |
| JP | 2007158765 | 6/2007 |
| JP | 2008017306 | 6/2008 |
| JP | 2008017306 A | 6/2008 |
| JP | 2008141372 | 6/2008 |
| JP | 2008141372 A | 6/2008 |
| RU | 2121762 | 11/1998 |
| RU | 2316146 | 1/2008 |
| RU | 74232 U1 | 6/2008 |
| WO | WO9952077 | 10/1999 |
| WO | WO0004677 | 1/2000 |
| WO | 03062955 A2 | 7/2003 |
| WO | WO2004023736 | 3/2004 |
| WO | WO2005041467 | 5/2005 |
| WO | 2005057332 A2 | 6/2005 |
| WO | WO2006015252 | 2/2006 |
| WO | WO2006043161 | 4/2006 |
| WO | WO2006133415 | 12/2006 |
| WO | WO2007038118 | 4/2007 |
| WO | 2007053299 A | 5/2007 |
| WO | WO2007052143 | 5/2007 |
| WO | WO2007053299 | 5/2007 |
| WO | WO2007078073 | 7/2007 |
| WO | WO2007081683 | 7/2007 |
| WO | WO2007122503 | 11/2007 |
| WO | WO2008020731 | 2/2008 |

OTHER PUBLICATIONS

IEEE LAN/MAN Standards Committee, "IEEE 802.11", http://en.wikipedia.org/wiki/IEEE_802.11, Jul. 11, 2012.

IEEE, "IEEE Standard for Information Technology—Telecommunications and Information Exchange Between Systems—Local and Metropolitan Area Networks—Specific Requirements", Part 11: Wireless LAN Medium Access control New York, New York Nov. 11, 2005.

Tang et al., "MAC Layer Broadcast Support in 802.11 Wireless Networks", MILCOM 2000, 21st Century Military Communications Conference Proceedings, vol. 1, Oct. 22-25, 2000, pp. 544-548.

Wang et al., "Opportunistic Media Access Control and Rate Adaptation for Wireless Ad Hoc Networks", 2004 IEEE International Conference on Communications, vol. 1, Paris France, Jun. 20-24, 2004, pp. 154-158.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 8: Medium Access Control (MAC) Quality of Service Enhancements, Nov. 11, 2005.

* cited by examiner

| FRAME CONTROL | DURATION | RA | TA | BAR CONTROL | BAR INFORMATION | RECEIVER INFORMATION | FCS |

*FIG. 4A*

| TYPE/FLAGS | RECEIVER/ STA 1 ID | .... | RECEIVER/ STA n ID |

*FIG. 4B*

| FRAME CONTROL | DURATION | RA | TA | BA CONTROL | BA INFORMATION | FCS |

*FIG. 5A*

| FLAGS | RESERVED | TID_INFO |

*FIG. 5B*

| BLOCK Ack STARTING SEQUENCE CONTROL | BLOCK ACK BITMAP |

| TYPE/FLAGS | BAR RECEIVER BITMAP CONTROL | BAR RECEIVER PARTIAL BITMAP |
|---|---|---|

FIG. 10 under STATES PATENT

METHOD AND SYSTEM FOR ACKNOWLEDGEMENT AND RETRANSMISSION OF MULTICAST DATA IN WIRELESS LOCAL AREA NETWORKS

This application claims the benefit, under 35 U.S.C. §365 of International Application PCT/US2008/008,032, filed Jun. 26, 2008, which was published in accordance with PCT Article 21(2) on Dec. 30, 2009, in English.

FIELD OF THE INVENTION

The present invention relates generally to wireless communication and specifically to a method and apparatus for acknowledging and retransmitting multicast data in wireless local area networks.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire subset. That is, multicast may include broadcast and is therefore a broader term than broadcast as used herein. Data is transmitted in packets or frames.

In wireless local area networks, an access point (AP)/base station/station (STA)/mobile device/mobile terminal/node transmits multicast and broadcast frames immediately after it determines that the wireless medium/channel is idle/clear using a physical and virtual carrier sense process with a random backoff time. Therefore, collisions may occur when multiple STAs attempt to transmit simultaneously. For example, an access point and its associated STAs may transmit simultaneously and then all the transmitted frames are lost due to collision. For example, when an AP sends multicast data frames to several of its associated STAs, another STA may send its data or control frames to the AP. The AP with its associated stations is called a basic service set (BSS). Collisions occurring within a BSS are called intra-BSS collisions. In another example, AP1 and AP2 operate on the same channel/frequency and the two BSSs overlap. AP1 transmits data frames to its associated STAs. However, AP2 cannot hear AP1's transmission and thinks that the medium is idle. AP1 is a "hidden node" to AP2. AP2 may transmit frames to its associated STAs while AP1 is transmitting. But there are STAs that are in the interference range of both AP1 and AP2 so that the transmitted frames from AP1 and AP2 are lost at the STAs due to collision. This type of collision is called overlap BSS collision or inter-BSS collision.

Multicast and broadcast provide an efficient method to distribute data to multiple receivers. However, it is a challenge to ensure the reliable receipt of data by multiple receivers in multicast and broadcast. It is especially important to provide an efficient mechanism for acknowledging multicast packets received by multiple receivers at the media access control and link layer.

Higher-layer (application layer and transport layer) schemes have been proposed to improve multicast reliability. In one prior art scheme, a negative acknowledgement (NACK) method was described, in which a receiver sends a NACK to the sender when it detects a gap of sequence number in the received packets. This approach results in additional delay and buffer requirements at both senders and receivers. Although the feedback overhead may be reduced by suppressing the number of NACKs sent by multiple multicast receivers, this scheme increases the complexity of guaranteeing high multicast reliability or no packet loss.

US2006/0109859 A1 "METHOD AND SYSTEM FOR EFFICIENT AND RELIABLE MAC-LAYER MULTICAST IN WIRELESS TRANSMISSIONS" by Acharya et al. describes a media access control (MAC) layer method for reliable multicasting in a wireless network. A sender node sends a Request-to-Send (RTS) signal to the receiver nodes. The RTS signal includes a set of identifiers or a bit vector corresponding to the receiver nodes. Each bit in the bit-vector indicates a recipient node. Clear-to-Send (CTS) signals are sent from the receiver nodes according to an order function of the set of identifiers or the bit vector. The sender sends a data packet to the receiver nodes after receiving at least one CTS signal. One or more ACK signals are sent from one or more of the receiver nodes according to an ordering function of the set of identifiers or a bit vector in the RTS signal, if a data packet has been received correctly. This approach uses a four-way handshake to send and to acknowledge a single data packet. The order of the ACK signals from multiple receivers is based on the identifiers or a bit vector in the RTS signal. The ACK signal acknowledges only a single packet. This scheme incurs a high overhead and hence reduces the network throughput.

In addition, in a wireless local area network (WLAN), an access point (AP) may have a large number of associated stations, or a sending node may have a large number of neighbor nodes. If the RTS signal includes a set of identifiers corresponding to the receiver nodes or a bit-vector, the RTS signal may become large, leading to more overhead.

Another approach uses multiple unicasts to send multicast data in a wireless network. An access point repeatedly unicasts multicast data packets, each unicast dedicated to a single intended receiver because unicast provides MAC layer acknowledgement and retransmission in the wireless network environment. However, this approach requires transmitting the same multicast data multiple times over a common broadcast channel, leading to a high overhead and low network throughput.

WO 2008/020731 A1 "MULTICAST PROCEDURE IN A WIRELESS NETWORK" by Huh et al., describes a method in which an originator/access point transmits data packets in multicast to multiple receivers and then uses unicast to poll each of the receivers individually for its receiving status of previously transmitted multicast data packets. Because the originator sends the block acknowledgement request (BAR) message in unicast to each of the receivers to request the receiving status individually, it transmits the BAR messages multiple times, one for each receiver. That is, the originator exchanges in unicast the block acknowledgement request (BAR) message and acknowledgement reply (B-ACK) messages with each of the receivers individually, one for each receiver. Therefore, this approach still incurs unnecessary overhead and reduces network efficiency and throughput.

It would be advantageous to have a method and apparatus to acknowledge multiple multicast packets from multiple receivers at the MAC-layer in wireless network environment. It is desirable to have an efficient method for reliable multicast data transmission, acknowledgement and retransmission.

SUMMARY OF THE INVENTION

The present invention provides a method and apparatus to obtain receiving status of multiple data units/frames/packets from multiple receivers for reliable multicast in a communication network. It includes multicasting multiple data units/frames/packets from a sender node to receiver nodes, then multicasting a multicast block acknowledgement request (M-BlockAckReq) signal from the sender node to the receiver nodes. The M-BlockAckReq signal includes the control information about the acknowledgement policy and the multiple packets that need to be acknowledged, and a set of identifiers or a bitmap control with a partial virtual bitmap. Use of a bitmap control and partial virtual bitmap reduces overhead. Each identifier or a bit in the bitmap corresponds to a receiver node. Multicast block acknowledgement (M-BlockAck) signals are sent from the receiver nodes in response to the M-BlockAckReq indicated by the set of identifiers or the bitmap. A M-BlockAck signal from a receiver includes the receiving status information of the multiple data units/packets/frames for which acknowledgement was requested in the M-BlockAckReq.

A method and apparatus are described including multicasting a plurality of data units and multicasting a request for acknowledging receipt of the plurality of data units, receiving signals responsive to the request. Also described are a method and apparatus including receiving a multicast request to acknowledge receipt of data, determining if a response to the request is required, determining status of the data, preparing the response based on the determining acts and transmitting the response.

BRIEF DESCRIPTION OF THE DRAWINGS

The present invention is best understood from the following detailed description when read in conjunctions with the accompanying drawings. The drawings include the following figures described below.

DETAILED DESCRIPTION OF THE PREFERRED EMBODIMENTS

Exemplary embodiments of the present invention are described using an IEEE 802.11 wireless local area network (WLAN). However, the present invention can be used in other wireless and wired networks. The present invention can be used in media access control (MAC)/link layer or higher layers (application and transport layers).

In existing IEEE 802.11-based wireless local area networks, multicast and broadcast is unreliable. There is no acknowledgement and retransmission of multicast data/packets/frames at the MAC layer. Multicast in IEEE 802.11-based wireless local area networks depends on higher layer protocols for recovery of lost multicast packets, which results in higher latency and lower network throughput.

Figure 1:
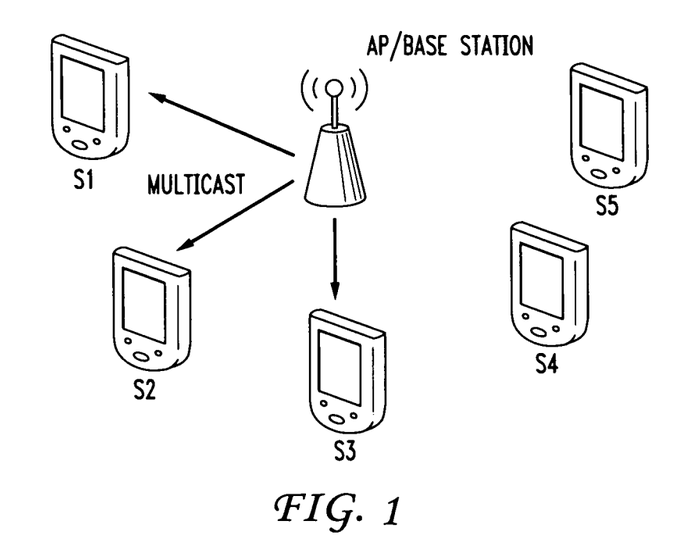
FIG. 1 shows an exemplary WLAN network.
Figure 2:
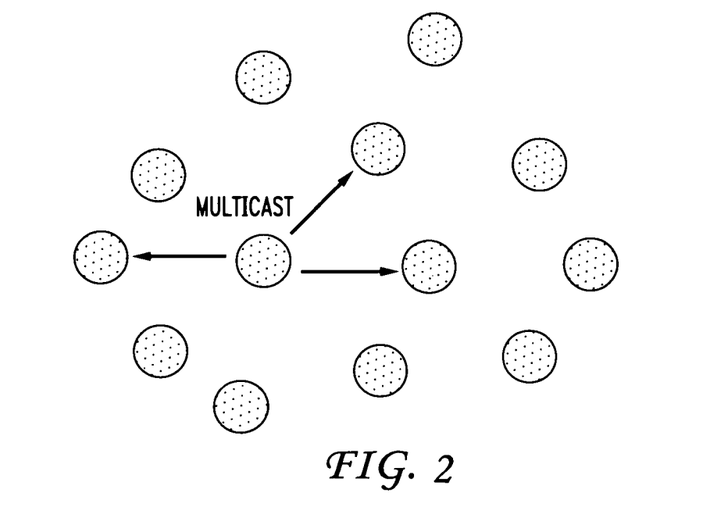
FIG. 2 shows a wireless mesh network, which includes multiple stations/nodes.

FIG. 1 shows an exemplary WLAN network. It includes an access point (AP) and multiple stations. The AP sends multicast and broadcast data/packets/frames to multiple stations. Note that AP is a special station which connects to a wired network. In the following, unless otherwise specified, STAs include APs. FIG. 2 shows a wireless mesh network, which includes multiple stations/nodes. A sender/transmitter station sends multicast and broadcast data/packets/frames to multiple receiver/destination stations.

Collisions may occur in a network using a shared medium if multiple stations attempt to access the medium/channel to send/transmit data at the same time. Media access control techniques are used to provide channel access control mechanisms and make it possible for multiple nodes to communicate within a network. One MAC technique is Carrier Sense Multiple Access (CSMA). In CSMA, an STA wishing to transmit first listens to the wireless medium/channel for a certain amount of time (an inter-frame interval/space plus a backoff time following a busy medium condition), so as to check for any activity on the medium. If the medium is sensed "idle/clear" then the STA is permitted to transmit. If the medium is sensed as "busy" the STA has to defer its transmission. This is the essence of both CSMA/Collision Avoidance (CSMA/CA) and CSMA/Collision Detection (CSMA/CD). Collision detection is used to improve CSMA performance by terminating transmission as soon as a collision is detected, and reducing the probability of a second collision on retry.

CSMA/CA also includes a modification of pure CSMA by sending a signal to reserve the medium for a period of time (a transmission opportunity). In CSMA/CA, a station conducts carrier sense multiple access. The carrier sense includes both physical carrier sensing and virtual carrier sensing. The virtual carrier sensing indicates whether other STAs have reserved the medium. Once the channel is idle/clear by both physical and virtual carrier sensing, and the STA is permitted to transmit, an originating STA may send a request-to-send (RTS) frame/message/signal. The intended receiver replies with a clear-to-send (CTS) frame/signal/message, if the intended receiver also senses that the medium is idle. The exchange of RTS and CTS frames/signals/messages occurs before actual data frame transmission, which reserves the medium for the following data transmission by telling/advising all other STAs not to transmit over the common/shared medium during the reserved duration that is specified in the duration field of the RTS and CTS frames/messages/signals. All STAs within the reception range of the sender, the receiver, or both, learn of the medium reservation through RTS or CTS signals/frames/messages and remain silent for the duration of the reserving station's transmission. CSMA/CA is used in IEEE 802.11 based wireless LANs.

Another commonly-used medium access control method for shared medium (e.g. wireless channel) networks is Time Division Multiple Access (TDMA). TDMA allows multiple stations to share the same channel by dividing the medium/channel into different timeslots. Each node is assigned a time slot, which it uses to transmit data. The schedule for time slot usage is controlled and distributed by a central controller at an access point/base station (centralized scheduling) or is established distributively by the nodes themselves.

Polling is another medium access control method for shared channels. An access point or a central controller controls the medium access. The AP can use the channel for downlink transmissions (from the AP to the associated STAs) or the AP can poll an associated STA for its uplink transmissions (from the associated STA to the AP).

Multiple polling (MP) is another alternative medium access control method for a shared channel. An AP or a controller can send a time schedule that is used by the AP and its one or more STAs to access the wireless medium for one or more downlink transmissions and one or more uplink transmissions.

Figure 3:
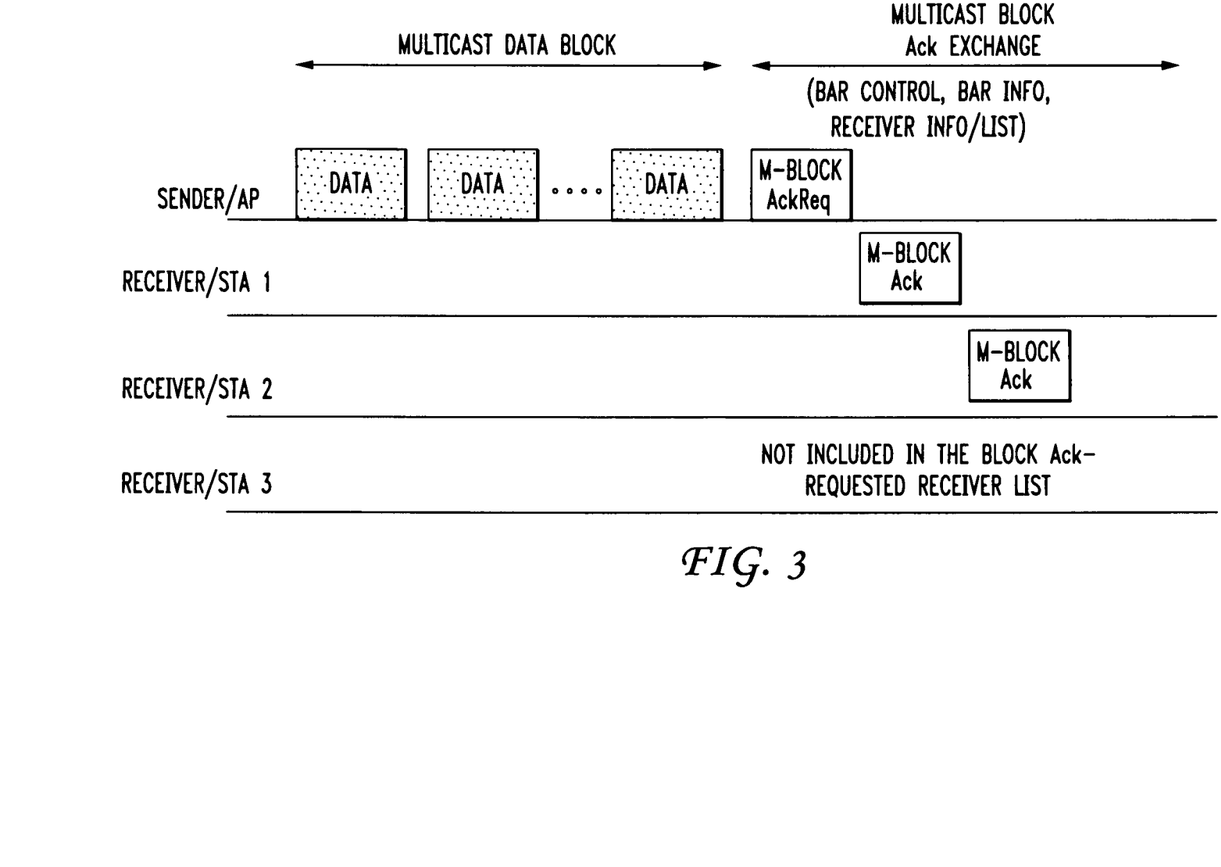
FIG. 3 shows a timing sequence for reliable multicast transmission using multicast block acknowledgement request (M-BlockAckReq) and multicast block acknowledgement (M-BlockAck) in an exemplary embodiment of the invention.

FIG. 3 shows a timing sequence for reliable multicast transmission using multicast block acknowledgement request (M-BlockAckReq) and immediate multicast block acknowledgement (M-BlockAck) exchange in an exemplary embodiment of the present invention. A sender/AP/originator transmits a block of multicast data units/packets/frames to multiple receivers/STAs, for example, receivers 1 and 2, but not receiver 3 in FIG. 3. Each data unit/packet/frame contains a sequence number or frame identifier. The sequence number is incremented, for example by 1. The data unit/packet/frame is transmitted using CSMA or TDMA, or polling or multiple polling. After sending a block of multicast data, the sender transmits a multicast BlockAckReq (M-BlockAckReq) signal to the multicast receivers. The M-BlockAckReq signal includes a block ack request (BAR) control field, a block ack request (BAR) information field, and a reliable multicast receiver (RMR) information field. The BAR control field and BAR information field include the traffic identifier(s) (TID (s)) for which a multicast BlockAck (M-BlockAck) frame is requested and the block ack starting sequence number. The starting sequence number is the sequence number of the first frame for which this M-BlockAckReq is requesting a M-BlockAck. The reliable multicast receiver information field contains a list of blockack-requested receiver identifiers from which the M-BlockAck is requested. In the example of FIG. 3, the identifiers are for receivers 1 and 2. The identifier can be the MAC address, or the association ID, or the IP address (if the present invention is executed/runs at the IP layer) of the station. Alternatively, the reliable multicast receiver information field contains a bitmap control field and a bitmap field to indicate the receivers from which the M-BlockAck is requested. Each bit in the bitmap identifies a receiving station from which the block ack is requested. Each receiver/receiving station in the blockack-requested receiver identifier list or the bitmap, (in the example of FIG. 3, receiver 1 and receiver 2), responds with a M-BlockAck in the order/sequence of the receivers specified in the list or bitmap. A receiver sends the M-BlockAck to acknowledge its receiving status of the block of data units/packets/frames with the starting sequence number specified in the M-BlockAckReq signal/message/frame. The receivers send their M-BlockAck signals/frames/messages in the same order/sequence in which they are specified in the M-BlockAckReq multicast receiver information field (i.e. the blockack-requested identifier list or bitmap). Alternatively, the receivers send their M-BlockAck signals in an order that is a function of the sequence of the receiver identifiers in the M-BlockAckReq identifier list or the M-BlockAckReq bitmap. The receivers/STAs that are not included in the block ack-requested receiver list or bitmap of the BlockAckReq do not respond to this BlockAckReq. In the example of FIG. 3, receiver 3 does not send M-BlockAck to respond this M-BlockAckReq because it is not included in the blockack-requested receiver identifier list or the bitmap.

Figure 4A:
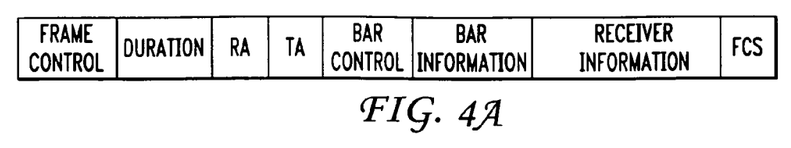
FIG. 4A shows an exemplary M-BlockAckReq signal/message/frame.
Figure 4B:
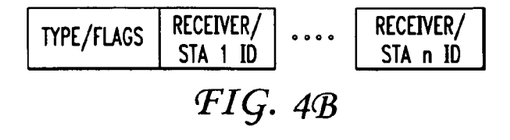
FIG. 4B shows an exemplary format of the receiver information field within M-BlockAckReq signal/message/frame.

FIG. 4A shows an exemplary M-BlockAckReq signal/message/frame, which contains a frame control field, a duration/ID field, a receiver address (RA) field, a transmitter address (TA) field, a BAR control field, a BAR information field, a receiver information (RI) field, frame check sequence (FCS) field, etc. The frame control field identifies the frame type, frame subtype and flags. The duration/ID field indicates the remaining time that the medium is to be used for transmission. The RA field indicates the medium access control (MAC) address of the intended receivers/destinations/receiving stations. The MAC address is a multicast address. The TA field indicates the MAC address of the transmitter. The BAR control field and the BAR information field indicate the traffic identifier (TID) and the starting frame sequence number for which this M-BlockAckReq is requesting a M-BlockAck. In addition, there may be multiple traffic categories or traffic streams with the same transmitter and receiver addresses, but different traffic identifiers (TID). For example, there may be one TID for video traffic and another TID for web data traffic. The BAR control field may also include the block ACK policy and M-BlockAckReq format indicators. For example, the BAR control field may specify whether immediate acknowledgements to this M-BlockAckReq are required, whether multiple traffic categories/traffic streams with different traffic identifiers (TID) can be acknowledged together. For multiple TIDs in a M-BlockAckReq, the BAR information field includes multiple sets of TIDs and block ack starting sequence numbers, one starting sequence number for each TID. The TID_INFO subfield of the BAR control field for the Multi-TID M-BlockAckReq contains the number of sets/instances of TID and BlockAck starting sequence numbers. The FCS field is used by the receiver to determine if there is error in the received frame. FIG. 4B shows an exemplary format of the receiver information field within M-BlockAckReq signal/message/frame, which contains a type/flags subfield, and a list of destination/receiver/recipient station identifiers. The Type/flags subfield indicates the format of the receiver information field. The destination/receiver/recipient station identifiers indicate the STAs/receivers from which this M-BlockAckReq is requesting a reply. The identifier can be the MAC address, or the association ID, or the IP address (if the present invention is executed/runs at the IP layer) of the station.

Figure 5A:
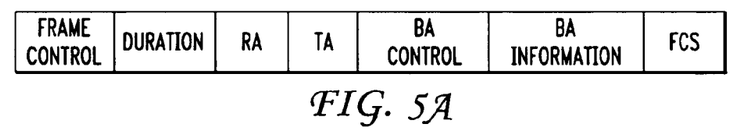
FIG. 5A shows an exemplary M-BlockAck signal/frame/message.

FIG. 5A shows an exemplary M-BlockAck signal/frame/message, which contains a frame control field, a duration/ID field, a receiver address (RA) field, a transmitter address (TA) field, a BA control field, a BA information field, a frame check sequence (FCS) field, etc. The frame control field identifies the frame type, frame subtype and flags. The duration/ID field indicates the remaining time that the medium is to be used for transmission. The RA field indicates the medium access control (MAC) address of the intended receiver/destination/receiving station, which is the address of the M-BlockAckReq originator that requested this M-BlockAck. The TA field is the address of the station transmitting this frame. The BA control field and the BA information field indicate the traffic identifier (TID), the block ACK starting frame sequence number, and the block ACK bitmap for blocks/units of data/packets/frames which the M-BlockAck frame acknowledges. In addition, the BA control field may also include the block ACK policy and M-BlockAck format indicators. The FCS field is used by the receiver to determine if there is error in the received frame.

Figure 5B:
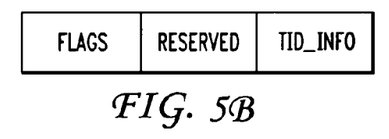
FIG. 5B shows an exemplary format of the BA control field within the M-BlockAck frame/signal/message.
Figure 5C:
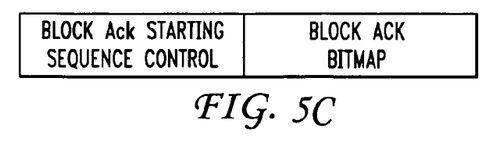
FIG. 5C shows an exemplary format of the BA information field within the M-BlockAck frame.

FIG. 5B shows an exemplary format of the BA control field within the M-BlockAck frame/signal/message, which includes the flags and TID_Info subfields. The flags indicate the block ACK policy and M-BlockAck format, for example, whether immediate acknowledgements are required, whether multiple traffic categories or traffic streams with different traffic identifiers (TID) can be acknowledged together. The TID_Info subfield contains the TID for which this M-BlockAck frame is an acknowledgement. FIG. 5C shows an exemplary format of the BA information field within the M-BlockAck frame, which includes the block ack starting sequence number and block ack bitmap. The starting sequence number is the sequence number of the first data unit/packet/frame for which this M-BlockAck is an acknowledgement, which is the same value of the starting sequence number in the immediately previously received M-BlockAckReq signal/frame/messsage. Bit position n of the BlockAck bitmap corresponds to a packet with a sequence number value equal to (BlockAck starting sequence number+n). It is used to indicate the received status of multiple packets/frames. A bit that is set to 1 in the BlockAck Bitmap acknowledges the successful reception of a packet. If bit position n of the BlockAck bitmap is set to 1, it acknowledges the successful receipt of a packet with a sequence number value equal to (BlockAck Starting Sequence Control+n). If bit position n of the BlockAck bitmap is set to 0, it indicates that a packet/data/frame with packet sequence number value equal to (BlockAck Starting Sequence Control+n) has not been received. Further, a M-BlockAck signal can acknowledge multiple traffic streams or traffic categories with different TIDs. For multiple TIDs in a M-BlockAck, the BA information field contains multiple sets/instances of TIDs, block ack starting sequence numbers and M-BlockAck bitmaps, one for each TID. The TID_INFO subfield of the BA control field for the Multi-TID M-BlockAck contains the number of sets/instances of TID info, the BlockAck starting sequence numbers and BlockAck bitmaps.

It is possible that M-BlockAckReq or M-BlockAck signals are lost or are not correctly received by the intended receivers/destinations/receiving stations. If a multicast sender transmits a M-BlockAckReq with a list of receiver identifiers in the receiver information field and it does not successfully receive the M-BlockAck signals from all the intended receivers, then the multicast sender retransmits the M-BlockAckReq with a list of the remaining receiver identifiers in the receiver information field from which it has not successfully received the M-BlockAck signals. The intended receivers/destinations/receiving stations in the list of the remaining receivers of the M-BlockAckReq each respond with a M-BlockAck. This process is repeated until the M-BlockAckReq sender receives M-BlockAcks from all the intended receivers/destinations/receiving stations or the number of retransmission attempts has reached a limit. Other policies for retransmitting M-BlockAckReq and M-BlockAck can be applied. For example, the multicast sender stops the retransmission attempt of a M-BlockAckReq or issues an updated M-BlockAckReq with a new block ack starting sequence number if the data packets requested for acknowledgement in the M-BlockAckReq have reached their lifetime/usefullness limit. Alternatively, the multicast sender stops the retransmission attempt of a M-BlockAckReq if the M-BlockAckReq has reached its lifetime limit. In another alternative policy, the M-BlockAckReq sender can stop retransmission attempts after it receives the M-BlockAcks corresponding to this M-BlockAckReq from a certain (predetermined) fraction of intended receivers/destinations/receiving stations or after a certain number of retries. The fraction is greater than or equal to a predetermined threshold. These policies can be used alone or in combination.

After completing the M-BlockAckReq and M-BlockAck exchanges, the multicast sender determines from the information provided in the M-BlockAck bitmap whether a packet needs to be retransmitted. If one or more packets are lost (not correctly received by one or more intended multicast receivers/destinations/receiving stations) according to the bitmap of the receiver block acks, the multicast sender arranges the retransmissions of this or these lost packets. The retransmitted packets are sent multicast to the intended receivers/destinations/receiving stations. After retransmitting the lost data packets and/or transmitting new packets, the multicast sender can send a new M-BlockAckReq and uses the above M-BlockAckReq and M-BlockAck exchange method to obtain the receiving status of (re)transmitted packets. If one or more packets are not correctly received by one or more intended multicast receivers according to the bitmap of the receiver block acks, the multicast sender arranges the retransmission of this or these lost packets again. This retransmission process can be repeated for a lost packet until all the intended receivers that sent the M-BlockAck receive the packet correctly or the transmission lifetime (usefullness) of this packet expires. Note that other policies for data packet multicasting can be applied. For example, the multicast sender stops the retransmission attempt of a data packet if the fraction of receivers that have correctly received this packet is greater than or equal to a threshold. In another exemplary policy, the multicast sender stops the retransmission attempt of a data packet if the number of retransmissions for this packet reaches a retry limit/threshold. These exemplary policies can be used singly or in combination.

Figure 6:
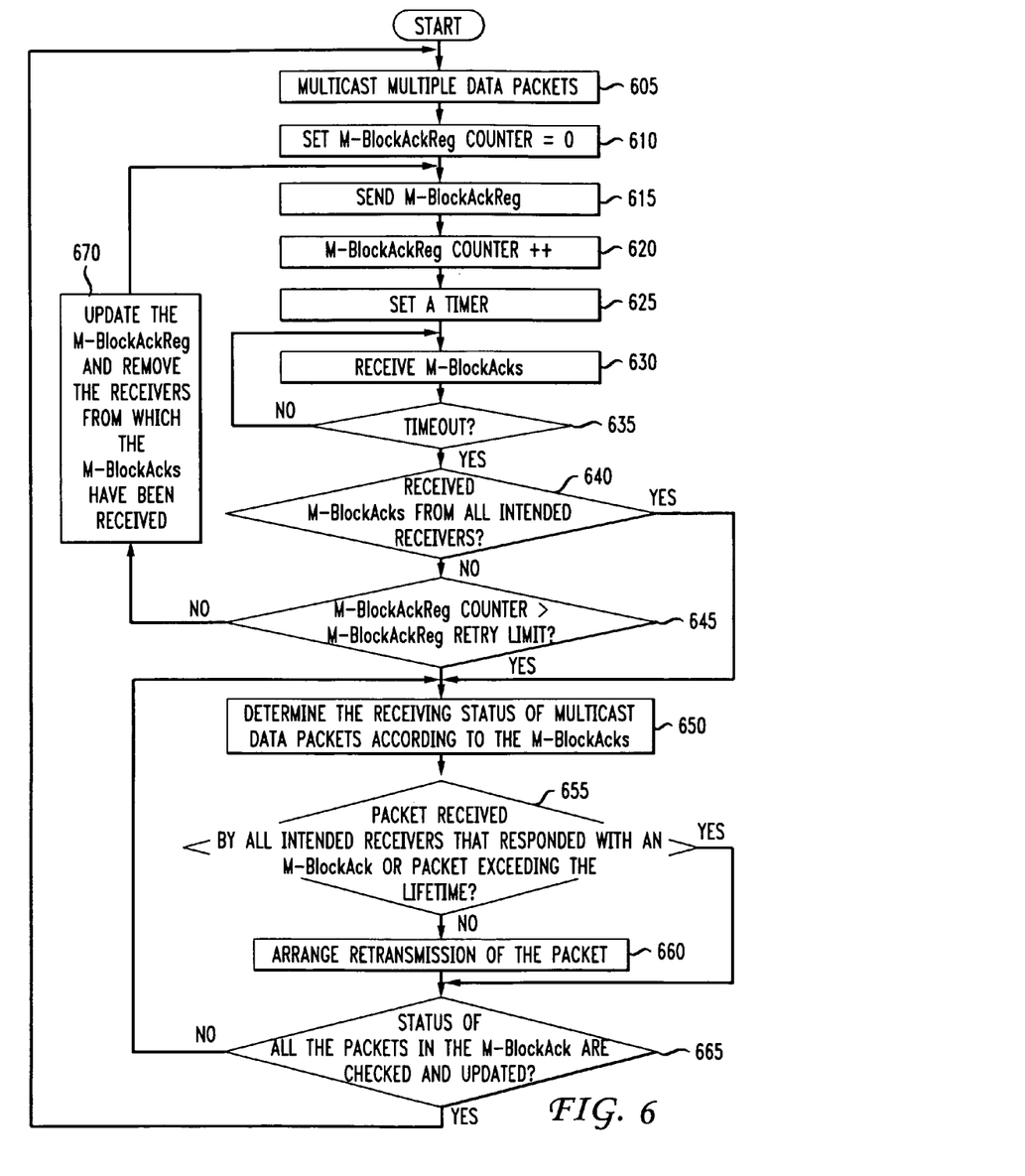
FIG. 6 is a flowchart for a multicast transmission procedure in accordance to an exemplary embodiment of the present invention.

FIG. 6 is a flowchart for a multicast transmission procedure in accordance with an exemplary embodiment of the present invention. At 605 a plurality of data units/packets/frames are multicast to intended receivers. The M-BlockAckReq counter is initialized at 610 and is multicast at 615. The M-BlockAckReq counter is incremented at 620 and a timer is set/initialized at 625. The station transmitting/multicasting the data begins receiving M-BlockAcks at 630. At 635 a test is performed to determine if there has been a timeout (the timer initialized/set at 625 has expired). If there has not been a timeout then processing returns to 630. If there has been a timeout then at 640 a test is performed to determine if M-BlockAcks have been received from all intended receivers/destinations/receiving stations. If M-BlockAcks have been received from all intended receivers/destinations/receiving stations then processing continues at 650. If M-BlockAcks have not been received from all intended receivers/destinations/receiving stations, then at 645 a test is performed to determine if the M-BlockAckReq counter has exceeded a M-BlockAckReq retry limit/threshold. This might also be implemented as a test under another policy described above, such as if the ratio of received M-BlockAcks to the number of expected M-BlockAcks exceeds a threshold. If the M-BlockAckReq counter has exceeded a M-BlockAckReq retry limit/threshold then the M-BlockAcks are checked to determine the status of the data that was multicast/transmitted at 650. At 655 a test is performed to determine if each multicast packet (multicast data) was received by the intended receivers that responded with M-BlockAcks or if the transmission lifetime (usefulness) of the packet/data has been exceeded (has expired). If a multicast packet (multicast data) was not received by all the intended receivers that responded with M-BlockAcks or if the transmission lifetime (usefulness) of the packet/data has not been exceeded (has expired) then the sender/transmitter arranges to retransmit/re-multicast the unreceived/unacknowledged packets to the intended receivers/destinations/receiving stations at 660. At 665 a test is performed to determine if the status of all the data/packets for which status was requested has been checked and updated. If the status of all the data/packets for which status was requested has not been checked and updated then processing returns to 650. If the status of all the data/packets for which status was requested has been checked and updated the processing returns to 605. If a multicast packet (multicast data) was received by all the intended receivers that responded with M-BlockAcks or if the transmission lifetime (usefulness) of the packet/data has been exceeded (has expired) then processing continues at 665. If the M-BlockAckReq counter has not exceeded a M-BlockAckReq retry limit/threshold, then at 670 the M-BlockAckReq is updated and receivers/destinations/receiving stations that have responded to the M-BlockAckReq are removed from the blockack-requested list in the M-BlockAckReq. Processing then continues at 615.

Figure 7:
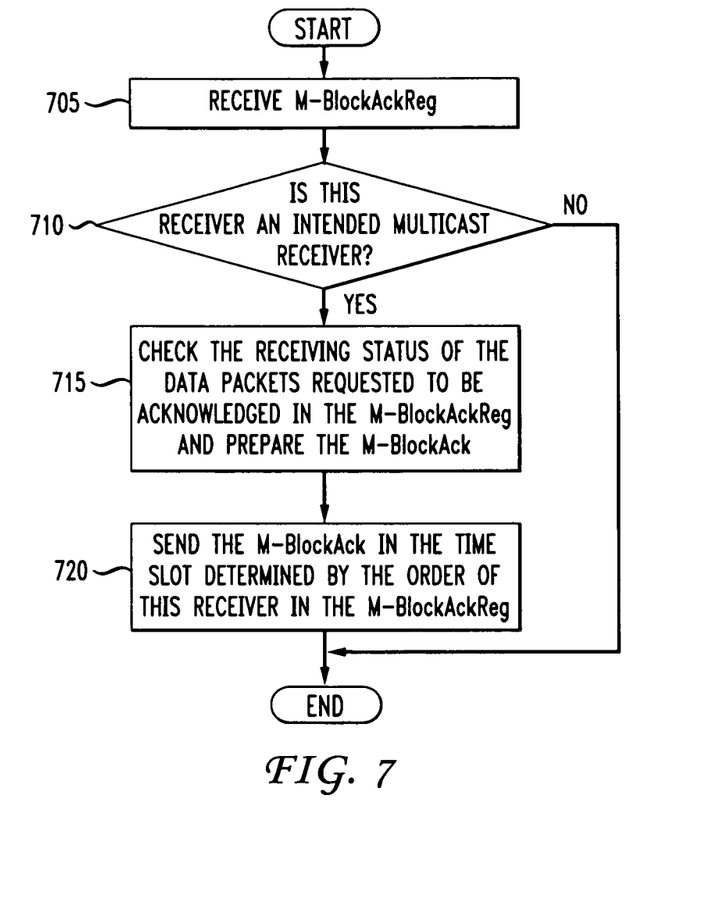
FIG. 7 is a flowchart for a multicast receiving procedure in accordance to an exemplary embodiment of the present invention.

FIG. 7 is a flowchart for a multicast receiving procedure in accordance to an exemplary embodiment of the present invention. At 705 a receiver/destination/receiving station receives a M-BlockAckReq. A test is performed at 710 to determine if this receiver/destination/receiving station is an intended receiver (one from which a blockack reply/response to the M-BlockAckReq is requested). If this receiver/destination/receiving station is not an intended receiver (one from which a blockack reply/response to the M-BlockAckReq is requested) then processing ends. If this receiver/destination/receiving station is an intended receiver (one from which a blockack reply/response to the M-BlockAckReq is requested) then the status of the multicast data/packets that this receiver has received and for which an acknowledgment has been requested (in the M-BlockAckReq) is determined and a M-BlockAck signal/frame/message is prepared/generated at 715. The prepared M-BlcokAck is transmitted (in unicast) at 720 in an order/sequence determined by information supplied/provided in the M-BlockAckReq.

Figure 8:
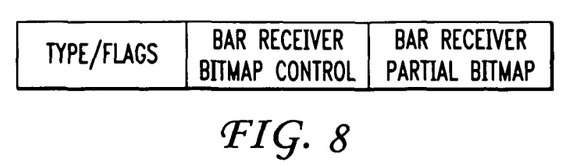
FIG. 8 shows an exemplary format of the receiver information field within a M-BlockAckReq frame/signal/message using the BAR receiver bitmap control and the BAR receiver partial virtual bitmap in accordance with an exemplary embodiment of the present invention.

In an alternative embodiment, the receiver information field within the M-BlockAckReq signal includes a type/flags subfield, a BAR receiver bitmap control subfield, a BAR receiver partial virtual bitmap, etc. FIG. 8 shows an exemplary format of the receiver information field within a M-BlockAckReq frame/signal/message using the BAR receiver bitmap control and the BAR receiver partial virtual bitmap in accordance with an exemplary embodiment of the present invention. The BAR receiver bitmap control field is a single octet. Seven bits of the field (bits 1-7) form the bitmap offset. One bit (bit 0) is reserved. The length of partial virtual bitmap varies and is a multiple of octets, which can be determined from the total frame size. The Bitmap Offset subfield value has the station's association ID (AID) divided by 16. If its value is N, the stations with AID less than 16×N are not included in the list of the stations that will reply to this M-BlockAckReq with a M-BlockAck. Each bit in the partial virtual bitmap field corresponds to a specific station. Bit number i ($0 \leq i \leq 2007$) in the bitmap field, i.e. bit number (i mod 8) in octet number [i/8] in the bitmap field, where the low-order bit of each octet is bit number 0 and the high order bit is bit number 7, corresponds to the station with an AID of 16×N+i. If bit i in the bitmap field is set to 1, then the station with AID 16×N+i is in the list of the reply-requested stations that are requested to reply to this M-BlockAckReq, where N is the bitmap offset field value. If the length of Partial Virtual Bitmap field is L octets, stations with AID greater than or equal to 16×N+8×L are not in the list of reply-requested stations. The intended receivers/destination/receiving stations send their M-BlockAck signals in the same order/sequence in which the receivers are specified in the BAR receiver bitmap of the M-BlockAckReq. Alternatively, the receivers/receiving stations/destinations send their M-BlockAck signals in an order that is a function of the sequence of the receivers specified in the M-BlockAckReq BAR receiver bitmap.

For example, the value of bitmap control field is 50. The size of partial virtual bitmap in the M-BlockAckReq is 2 octets. The bitmap is 10111111 01111111. All the stations with AID less than 16×50=800 do not send a M-BlockAck because they are not addressed in the M-BlockAckReq. The stations with AID greater than or equal to 800+2×8=816 will not send M-BlockAcks either. The ith position in the partial bitmap of the M-BlockAckReq indicates the station with an AID of 800+i. Based on the bit pattern 10111111 01111111, the stations with the AID equal to 800, 802, 803, 804, 805, 806, 807, 809, 810, 811, 812, 813, 814, 815 will send the M-BlockAck in order because their corresponding bits are set to 1. Stations with the AID equal to 801 and 808 will not send M-BlockAcks because their corresponding bits are set to 0. Note that by using the bit map control field and partial bitmap, three octets are needed to represent the receiver stations that need to respond the M-BlockAckReq with M-BlockAck. If a set of 16-bit identifiers are included in the M-BlockAckReq to indicate the recipient stations that are requested to reply, then the M-BlockAck requires 14 octets. If just a bit-vector is used in the M-BlockAckReq to indicate the recipient stations that are requested to reply, then the M-BlockAck requires at least 12 octets. Therefore, the bitmap control field and partial bitmap of the present invention reduces the overhead in the M-BlockAckReq signal. It provides an efficient addressing method when the number of associated stations associated with an AP is high and/or the number of intended receivers for multicast is large.

Figure 9A:
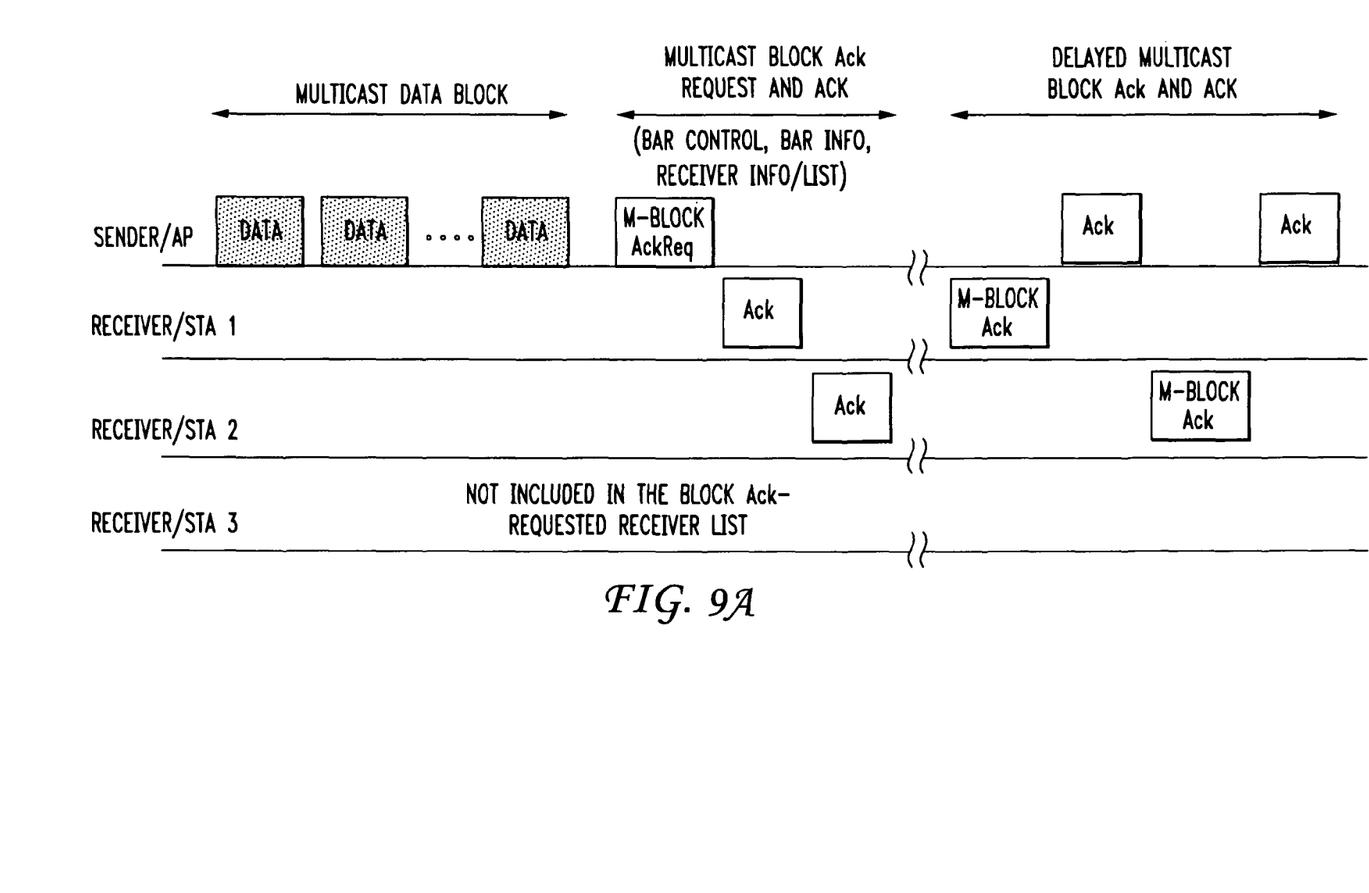
FIG. 9A shows a timing sequence for reliable multicast transmission using the exchange of multicast block acknowledgement request (M-BlockAckReq) and multicast block acknowledgement (M-BlockAck) with delayed policy and acknowledgement in an alternative embodiment of the invention.

FIG. 9A shows a timing sequence for reliable multicast transmission using the exchange of multicast block acknowledgement request (M-BlockAckReq) and multicast block acknowledgement (M-BlockAck) with a delayed acknowledgement policy in an alternative embodiment of the invention. A sender/AP/originator transmits a block of multicast data units/packets/frames to multiple receivers/STAs, for example, receivers 1 and 2, but not receiver 3. Each data unit/packet/frame contains a sequence number or frame identifier. The sequence number is incremented, for example by 1. The data unit/packet/frame is transmitted using CSMA or TDMA, or polling or multiple polling. After sending a block of multicast data, the sender transmits a multicast BlockAckReq (M-BlockAckReq) signal/frame/message to the intended multicast receivers. The M-BlockAckReq signal/message/frame includes a block ack request (BAR) control field, a block ack request (BAR) information field, and reliable multicast receiver (RMR) information field. The BAR control field and BAR information field include the traffic identifier(s) (TID(s)) for which a multicast BlockAck (M-BlockAck) frame is requested and the block ack starting sequence number. The starting sequence number is the sequence number of the first frame for which this M-BlockAckReq is requesting a M-BlockAck. The reliable multicast receiver information field contains a list of block ack-requested receiver identifiers from which the M-BlockAck is requested, in the example of FIG. 9A, the identifiers of receivers 1 and 2 are included. The identifier can be the MAC address, or the association ID, or the IP address (if the present invention is executed/runs at the IP layer) of the station. Alternatively, the RMR information field contains a bitmap control field and a bitmap field to indicate the receivers from which the M-BlockAck is requested. Each bit in the bitmap identifies a receiving station from which the block ack is requested. Each multicast receiver/receiving station in the blockack-requested receiver identifier list or the bitmap, (in the example of FIG. 9A, receiver 1 and receiver 2), responds to the M-BlockAckReq originator with block acknowledgement (Ack) signal/frame or other frame/signal in the order/sequence of the multicast receivers specified in the M-BlockAckReq list or bitmap, which acknowledges receiving the M-BlockAckReq successfully. Alternatively, the receivers send their BlockAck signals/frames/messages in an order that is a function of the sequence of the receiver identifiers in the M-BlockAckReq identifier list or the M-BlockAckReq bitmap. The multicast receiver then sends its delayed M-BlockAck response after it prepares the M-BlockAck and has the opportunity to transmit. Once the contents of the M-BlockAck signal/frame/message are prepared, the multicast receiver sends the delayed M-BlockAck in its earliest possible transmission opportunity (TXOP). The M-BlockAck acknowledges the receiving status of the block of data units/packets/frames with the starting sequence number specified in the M-BlockAckReq signal/frame/message. The M-BlockAckReq originator responds with an Ack signal/frame/message or other signal/frame/message to acknowledge the receipt of the M-BlockAck signal/frame/message. The M-BlockAck originator transmits the Ack signal/message/frame in unicast. The STAs not specified in the BlockAckReq list or bitmap do not respond to the M-BlockAckReq originator. In the example of FIG. 9A, receiver 3 does not respond to the M-BlockAckReq because it is not included in the blockack-requested receiver identifier list or the bitmap of the M-BlockAckReq.

Figure 9B:
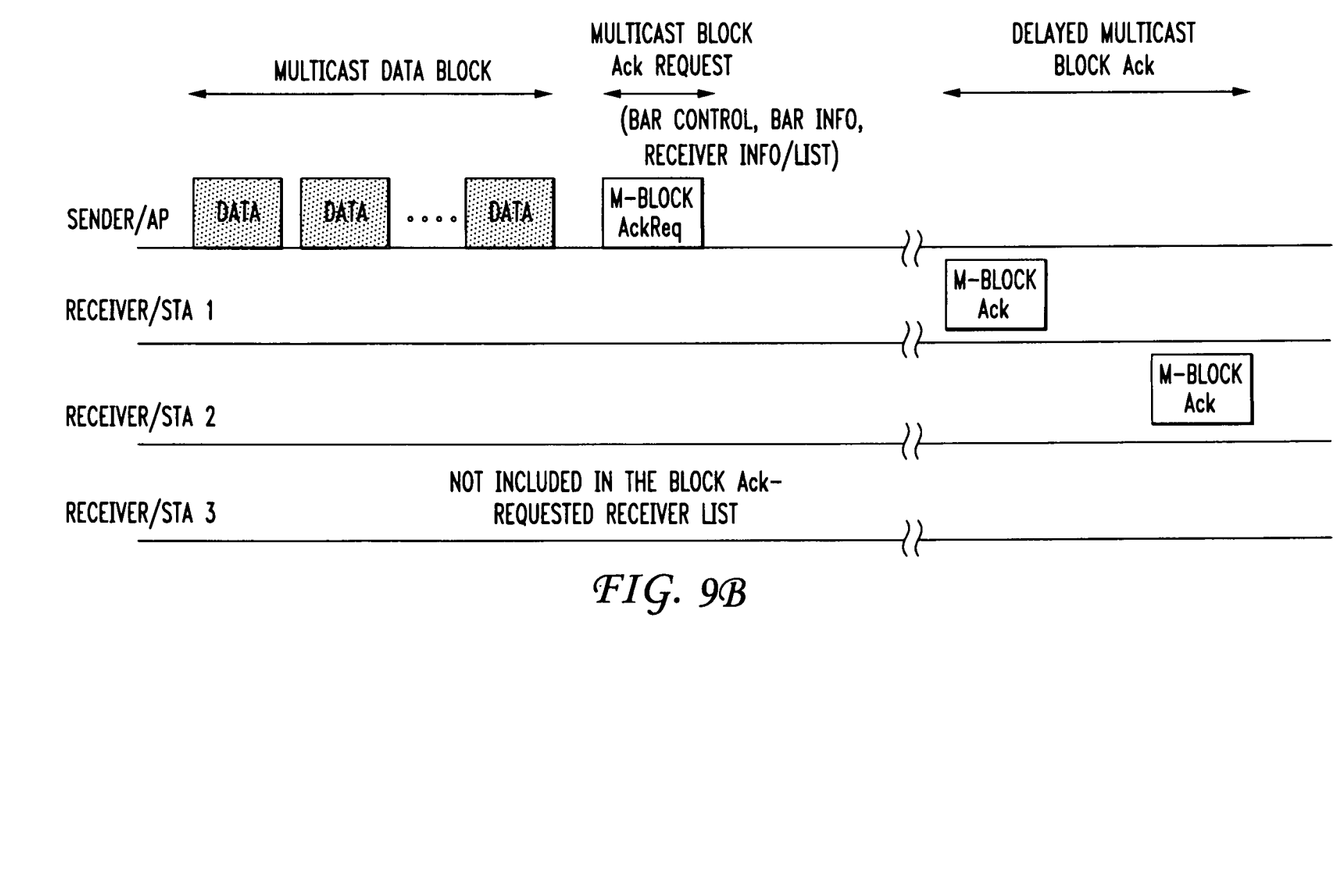
FIG. 9B shows a timing sequence for reliable multicast transmission using the exchange of multicast block acknowledgement request (M-BlockAckReq) and multicast block acknowledgement (M-BlockAck) with delayed policy and no acknowledgement in an alternative embodiment of the invention.

FIG. 9B shows a timing sequence for reliable multicast transmission using the exchange of multicast BlockAckReq and multicast BlockAck with a delayed acknowledgement policy and no acknowledgement of M-BlockAckReq and M-BlockAck in an alternative embodiment of the invention. A sender/AP/originator transmits a block of multicast data units/packets/frames to multiple receivers/STAs, for example, receivers 1 and 2, but not receiver 3. After sending a block of multicast data, the originator transmits a multicast BlockAckReq (M-BlockAckReq) signal/frame/message to the intended multicast receivers. The reliable multicast receiver (RMR) information field in the M-BlockAckReq contains a list of block ack-requested receiver identifiers from which the M-BlockAck is requested, in the example of FIG. 9B, the identifiers of receivers 1 and 2 are included. Alternatively, the RMR information field contains a bitmap control field and a bitmap field to indicate the receivers from which the BlockAck is requested. Each bit in the bitmap identifies a receiving station from which the block ack is requested. If no ack feature/policy of the M-BlockAckReq is used, each multicast receiver/receiving station in the block ack-requested receiver identifier list or bitmap, (in the example of FIG. 9B, receiver 1 and receiver 2), does not respond to the M-BlockAckReq originator with an acknowledgement (Ack) signal/frame/message upon receipt of the M-BlockAckReq. With delayed Block Ack policy, a multicast receiver in the block ack requested list or bitmap responds to the M-BlockAckReq originator with delayed M-BlockAck signal/frame/message after it prepares the M-BlockAck and has the opportunity to transmit. Once the contents of the M-BlockAck signal/frame/message are prepared, the multicast receiver sends the M-BlockAck at its earliest possible transmission opportunity. If no ack feature/policy of the M-BlockAck is used, the M-BlockAckReq originator does not respond with an Ack signal/frame/message to acknowledge the receipt of the M-BlockAck signal/frame/message. The STAs not specified in the BlockAckReq list or bitmap do not respond to the M-BlockAckReq originator. In the example of FIG. 9B, receiver 3 does not respond to the M-BlockAckReq because it is not included in the block ack-requested receiver identifier list or the bitmap of the M-BlockAckReq. In general, with a delayed Block Ack policy, a M-BlockAckReq or M-BlockAck signal/frame/message contains an Ack Policy field. When the Ack policy field is set in a M-BlockAckReq or M-BlockAck signal/frame/message, it indicates that no acknowledgement is expected to this frame/signal/message upon its receipt. Otherwise, an Ack response is expected. Setting of the Ack policy field may be performed independently for M-BlockAckReq and M-BlockAck frames/signals/messages. All four combinations of the values of these fields can be used.

Figure 9C:
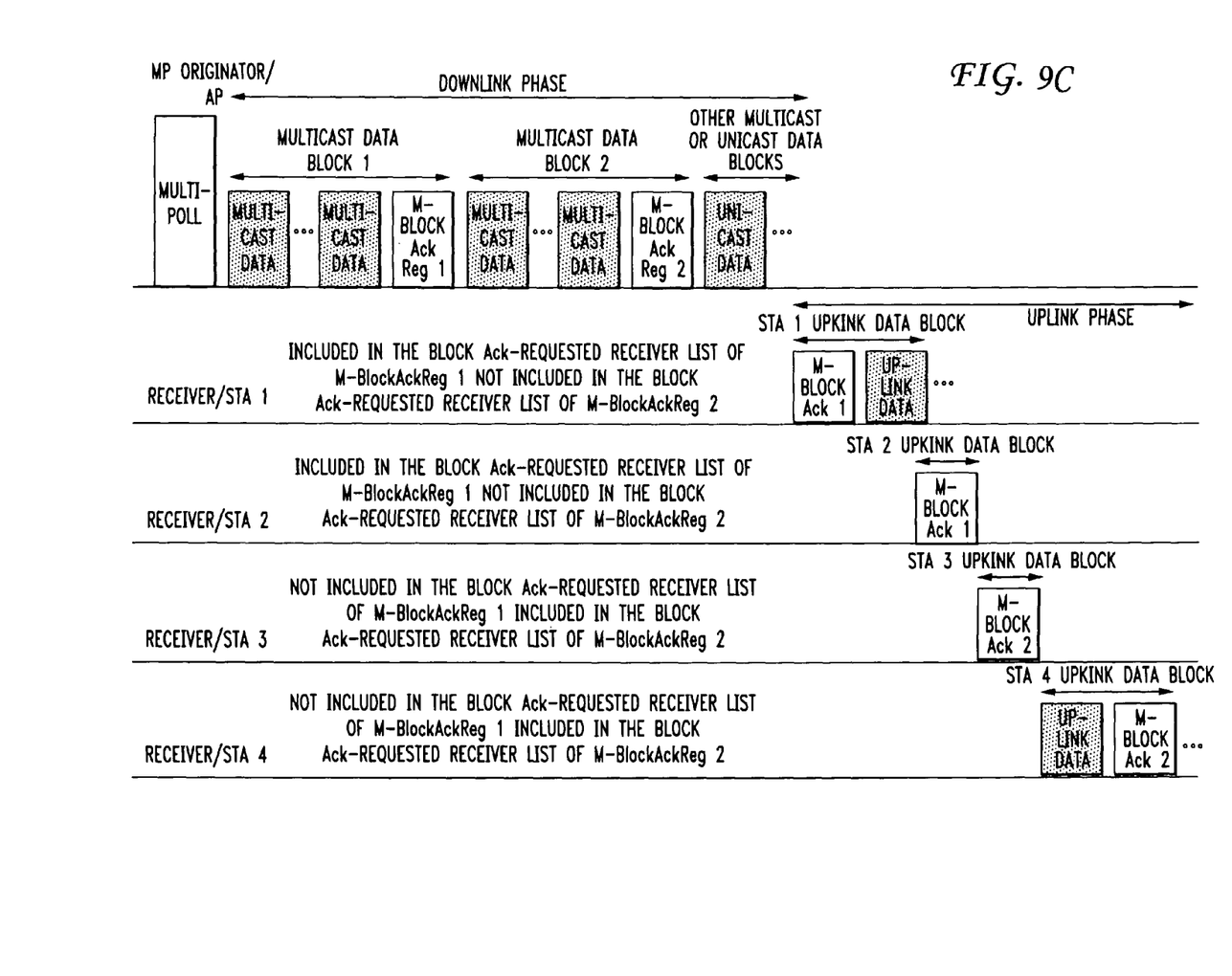
FIG. 9C shows a timing sequence for reliable multicast transmission using the exchange of multicast block acknowledgement request (M-BlockAckReq) and multicast block acknowledgement (M-BlockAck) with multiple poll in an alternative embodiment of the invention.

FIG. 9C shows a timing sequence for reliable multicast transmission using the exchange of multicast BlockAckReq and multicast BlockAck along with multiple poll (MP) in an exemplary embodiment of the invention. A multi-poll originator/sender/AP transmits a multiple poll (MP) frame. The MP frame contains the schedule/time allocation of the downlink (from the MP originator/AP to the receivers/STAs) transmission time (DTT) and/or uplink (from a STA to the MP originator/AP) transmission time (UTT). The MP originator/AP may schedule multiple DTTs and UTTs. A DTT or UTT has a start time and a duration. A DTT period is used for the MP originator/AP to transmit a block of multicast or unicast data units/frames/packets associated with a multicast or unicast address. An UTT period is used for a STA to transmit a block of data to the MP originator/AP. After the MP originator/AP transmits a block of multicast data units/packets/frames to multiple receivers/STAs, it transmits a multicast BlockAckReq (M-BlockAckReq) signal/frame/message. The multicast receiver/receiving station/destination responds to the M-BlockAckReq originator with a M-BlockAck signal/frame in its own UTT to acknowledge the receiving status of the block of data units/packets/frames requested by the M-BlockAckReq. As shown in the example of FIG. 9C, the AP/MP-originator transmits the first block of multicast data with a multicast address, the second block of multicast data with another multicast address, and other blocks of multicast and/or unicast data. After transmitting the first block of multicast data, the AP/MP originator sends the M-BlockAckReq 1. Each intended receiver/STA of the first block of multicast data, e.g. receiver 1 and receiver 2, responds to the M-Block- AckReq 1 with its M-BlockAck in its UTT period. Besides a M-BlockAck, a receiver/STA may also send other uplink data in its UTT period. Similarly, after transmitting the second block of multicast data, the AP/MP originator sends the M-BlockAckReq 2. Each intended receiver/STA of the second block of multicast data, e.g. receiver 3 and receiver 4, responds to the M-BlockAckReq 2 with its M-BlockAck in its own UTT period. Alternatively, the M-BlockAckReq can be sent in a different MP DTT (not the same DTT in which the corresponding block of multicast data units/packets/frames is sent) or a different MP sequence/burst. In addition, a block of multicast data units/packets/frames may be sent in multiple MP DTTs and then a M-BlockAckReq is sent in the last MP DTT in which the block of data is transmitted or in a following/later MP DTT by the multicast sender to request the M-BlockAck to acknowledge this block of multicast data units/packets/frames.

The present invention can also be used for a station (STA includes stations, APs and mesh APs) to exchange of block ack request and block ack for multicast and broadcast transmissions in a wireless mesh network, an ad hoc network or an independent basic service set (IBSS). It can be used for peer-to-peer multicast among the stations. The station can use the method in the present invention to send multicast block ack requests for transmitted multicast data to multiple recipient stations, for example in video conferencing or other peer-to-peer services. The recipient stations respond to the multicast block ack request originator with the multicast block ack.

Figure 10:
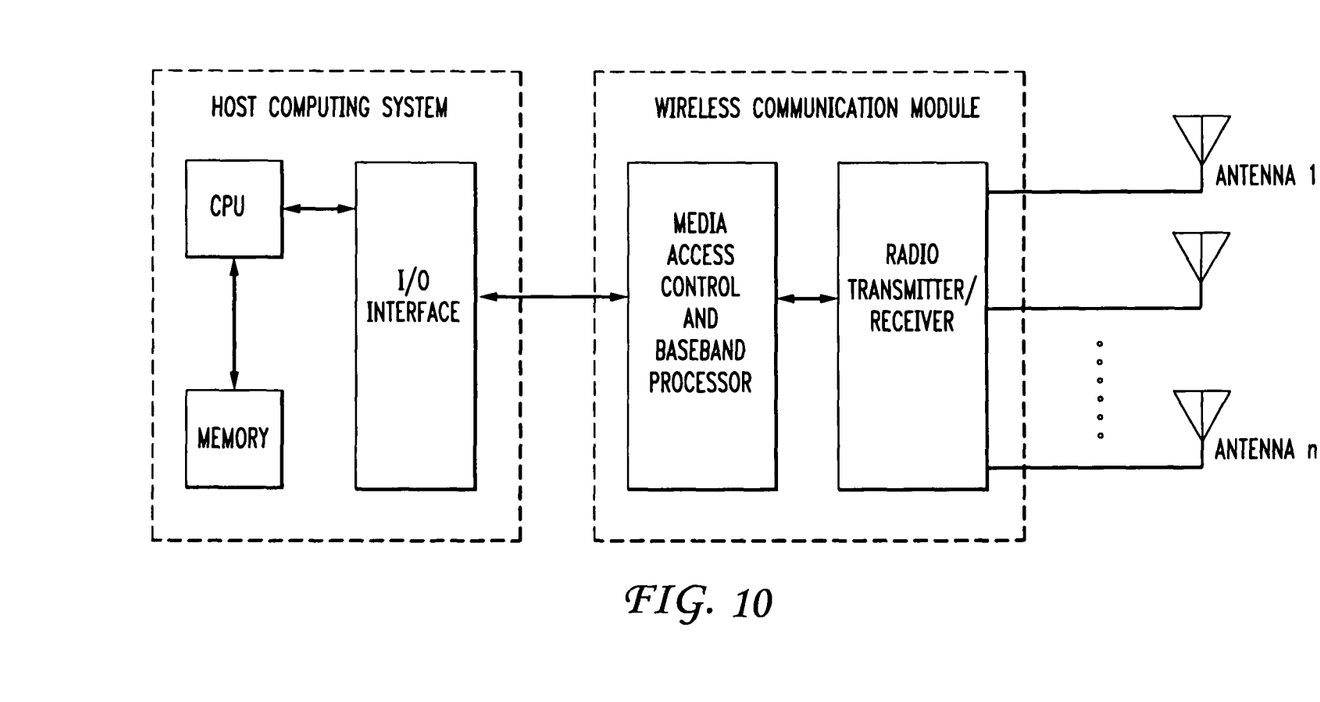
FIG. 10 is a block diagram of an exemplary implementation of the present invention.

Referring now to FIG. 10, which is a block diagram of an exemplary implementation of the present invention. Since a STA and/or AP (which is a special STA) can be a transmitter, a receiver or a transceiver, a single block diagram is used showing a wireless communication module having a radio transmitter/receiver. That is, the radio transmitter/receiver can be a transmitter, a receiver or a transceiver. The present invention includes a host computing system and a communication module (wireless). The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The MAC and baseband processor performs MAC control and data framing, modulation/demodulation, coding/decoding for the transmission/receiving. At least one embodiment of the present invention can be implemented as a routine in the host computing system or the wireless communication module to process the transmission and receiving of data and control signal. That is, the block diagram of FIG. 10 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagram thus fully enables the various methods/processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
multicasting a plurality of data units;
initializing a request counter;
multicasting a request for acknowledging receipt of said plurality of data units;
incrementing said request counter;
initializing a timer;
receiving signals responsive to said request;
first determining if said timer has expired prior to receiving said signals from all receivers;
second determining if said signals responsive to said request have been received from all receivers of said request;
third determining whether said request counter has exceeded a retry limit;
updating said request for acknowledgment of said plurality of data units responsive to said third determination;
fourth determining reception status of said plurality of data units based on said received signals;
removing any identification of responding receivers from which said signals responsive to said request for acknowledgment have been received; and
re-multicasting said request for acknowledgement.

2. The method according to claim 1, further comprising:
determining if a lifetime of said data units has been expired; and
re-multicasting said data units responsive to said determination.

3. The method according to claim 1, further comprising receiving an acknowledgment for each multicast request.

4. The method according to claim 1, further comprising transmitting an acknowledgment for each signal received.

5. The method according to claim 1, wherein said signals are delayed.

6. The method according to claim 1, further comprising receiving uplink data from said receivers.

7. The method according to claim 1, wherein said identification is one of an association identifier, a media access control address, an internet protocol address and contained within a bitmap arrangement.

8. An apparatus, comprising:
means for multicasting a plurality of data units;
means for initializing a request counter;
means for multicasting a request for acknowledging receipt of said plurality of data units;
means for incrementing said request counter;
means for initializing a timer;
means for receiving signals responsive to said request;
means for first determining if said timer has expired prior to receiving said signals from all receivers;
means for second determining if said signals responsive to said request have been received from all receivers of said request;
means for third determining whether said request counter has exceeded a retry limit;
means for updating said request for acknowledgment of said plurality of data units responsive to said third determination;
means for fourth determining reception status of said plurality of data units based on said received signals;
means for removing any identification of responding receivers from which said signals responsive to said request for acknowledgment have been received; and
means for re-multicasting said request for acknowledgement.

9. The apparatus according to claim 8, further comprising:
means for fifth determining if a lifetime of said data units has been expired; and
means for re-multicasting said data units responsive to said determination.

10. The apparatus according to claim 8, further comprising means for receiving an acknowledgment for each multicast request.

11. The apparatus according to claim 8, further comprising means for transmitting an acknowledgment for each signal received.

12. The apparatus according to claim 8, wherein said signals are delayed.

13. The apparatus according to claim 8, further comprising means for receiving uplink data from said receivers.

14. The apparatus according to claim 8, wherein said identification is one of an association identifier, a media access control address, an internet protocol address and contained within a bitmap arrangement.

* * * * *